US012738494B2

(12) United States Patent
Park et al.

(10) Patent No.: US 12,738,494 B2
(45) Date of Patent: Sep. 15, 2026

(54) LITHIUM-DOPED SILICON-BASED NEGATIVE ELECTRODE ACTIVE MATERIAL, METHOD OF PRODUCING THE SAME, METHOD OF POST-TREATING THE SAME, AND NEGATIVE ELECTRODE AND SECONDARY BATTERY INCLUDING THE SAME

(71) Applicant: SK ON CO., LTD., Seoul (KR)

(72) Inventors: Eun Jun Park, Daejeon (KR); Joon Hyung Moon, Daejeon (KR); Ju Ho Chung, Daejeon (KR)

(73) Assignee: SK On Co., Ltd., Seoul (KR)

( * ) Notice: Subject to any disclaimer, the term of this patent is extended or adjusted under 35 U.S.C. 154(b) by 569 days.

(21) Appl. No.: 18/327,058

(22) Filed: Jun. 1, 2023

(65) Prior Publication Data

US 2023/0395800 A1 Dec. 7, 2023

(30) Foreign Application Priority Data

Jun. 2, 2022 (KR) ........................ 10-2022-0067327

(51) Int. Cl.

*H01M 4/58* (2010.01)
*C01B 33/32* (2006.01)
*H01M 4/02* (2006.01)

(52) U.S. Cl.

CPC ......... *H01M 4/5825* (2013.01); *C01B 33/325* (2013.01); *C01P 2006/40* (2013.01); *H01M 2004/027* (2013.01)

(58) Field of Classification Search

CPC ......... H01M 2004/027; H01M 4/1395; H01M 4/386; H01M 4/134; H01M 4/5825; H01M 10/0525; H01M 4/366; C01B 33/113; C01B 33/325; C01B 33/32; C01P 2006/40; Y02E 60/10

See application file for complete search history.

(56) References Cited

U.S. PATENT DOCUMENTS

2018/0261833 A1 9/2018 Hirose et al.
2022/0149358 A1 5/2022 Moon et al.

FOREIGN PATENT DOCUMENTS

CN 112201779 A * 1/2021 ............ H01M 4/366
JP 2019204683 A * 11/2019
KR 10-1437074 B1 9/2014
KR 10-2016-0038984 A 4/2016
KR 10-2018-0114035 A 10/2018
KR 10-2019-0057577 A 5/2019
KR 10-2021-0116327 A 9/2021
KR 10-2022-0014863 A 2/2022
KR 10-2022-0052541 A 4/2022
KR 10-2022-0065124 A 5/2022

OTHER PUBLICATIONS

Office Action for Korean Patent Application No. 10-2022-0067327 issued by the Korean Intellectual Property Office (KIPO) on Aug. 13, 2025.

Extended European Search Report for the European Patent Application No. 23176567.8 issued by the European Patent Office on Oct. 24, 2023.

Office Action for Korean Patent Application No. 10-2022-0067327 issued by the Korean Patent Office on Feb. 19, 2026.

* cited by examiner

*Primary Examiner* — Mark Kopec
*Assistant Examiner* — Jaison P Thomas
(74) *Attorney, Agent, or Firm* — IP & T GROUP LLP

(57) ABSTRACT

Provided are a lithium-doped silicon-based negative electrode active material, a method of producing the same, and a negative electrode and a lithium secondary battery including the same. According to an exemplary embodiment of the present invention, a method of producing a negative electrode active material for a secondary battery including: a) a metal doping process of mixing a silicon-based material and a metal precursor and performing a heat treatment to dope the silicon-based material with a metal; and b) an acid gas treatment process of treating the metal-doped silicon-based material in an acid gas atmosphere to remove residual metal may be provided.

14 Claims, No Drawings

LITHIUM-DOPED SILICON-BASED NEGATIVE ELECTRODE ACTIVE MATERIAL, METHOD OF PRODUCING THE SAME, METHOD OF POST-TREATING THE SAME, AND NEGATIVE ELECTRODE AND SECONDARY BATTERY INCLUDING THE SAME

CROSS-REFERENCE TO RELATED APPLICATIONS

This application claims priority under 35 U.S.C. § 119 to Korean Patent Application No. 10-2022-0067327, filed on Jun. 2, 2022, in the Korean Intellectual Property Office, the disclosure of which is incorporated herein by reference in its entirety.

TECHNICAL FIELD

The following disclosure relates to a lithium-doped silicon-based negative electrode active material, a method of producing the same, a method of post-treating the same, and a negative electrode and a lithium secondary battery including the same.

BACKGROUND

As an issue of global warming which is a problem in modern society arises, a demand for environmentally friendly technologies is rapidly increasing in response thereto. In particular, as a technical demand for electric vehicles and energy storage systems (ESS) increases, a demand for a lithium secondary battery in the spotlight as an energy storage device is exploding. Therefore, studies to improve energy density of the lithium secondary battery are in progress.

However, previously commercialized lithium secondary batteries commonly use a graphite active material such as natural graphite and artificial graphite, but since battery energy density is low due to the low theoretical capacity of the graphite (372 mAh/g), studies to improve the energy density by developing a new negative electrode material are in progress.

As a solution to the problem, a Si-based material having a high theoretical capacity (3580 mAh/g) is emerging as one solution. However, the Si-based material as such has a disadvantage of deteriorated battery life characteristics due to large volume expansion (~400%) in a repeated charge and discharge process. Thus, as a method of solving the issue of large volume expansion of the Si material, a $SiO_x$ material which has a volume expansion rate lower than Si has been developed. Though the $SiO_x$ material shows excellent life characteristics due to its low volume expansion rate, it is difficult to apply the $SiO_x$ material to a lithium secondary battery in practice due to the unique low initial coulombic efficiency (ICE) by initial formation of an irreversible phase.

In order to solve the problem, initial efficiency may be drastically improved by a prelithiation (pre-lithiation, Li predoping, Li-predoping, Li pretreatment) method, but pH is increased by a large amount of residual lithium having high activity generated in the treatment, which causes deterioration of a binder in the production of a water-based electrode to make electrode production difficult. Besides, residual lithium is continuously eluted and hydrogen gas occurs in a water-based slurry state, and thus, a stability problem may be caused when the slurry is left for a long time, and also, a stored slurry undergoes viscosity change over time to increase non-uniformity of the slurry, so that it may be difficult to perform uniform coating in the production of an electrode.

SUMMARY

There is a limitation to removing residual lithium such as $Li_2CO_3$ and LiOH with water washing. Though the two compounds are known to have high solubility in water, their dissolution rate may not be said to be fast, and in general, when a washing time exceeds a certain amount of time, the compound is produced again to rather show an adverse effect of increasing the concentration of residual lithium in a raw material.

When a prelithiated silicon-based negative electrode active material is directly immersed in a high-concentration acid solution or strong acid solution in application of acid washing in order to remove residual lithium, a silicon oxide and various lithium silicates included in the silicon-based negative electrode active material may be etched together, which may lead to a decrease in battery capacity and initial efficiency.

For this reason, a process of immersing a negative electrode active material in a low-concentration weak acid solution may be considered as a method capable of controlling the content of residual lithium within a range of maintaining the performance of a material during acid washing. However, since there may be a certain limitation in controlling the content of residual lithium by the method as such, it is difficult to control physical properties due to the remaining active residual lithium in slurry production.

Therefore, development of a technology which may secure excellent capacity and initial efficiency of a negative electrode material by effectively removing residual lithium while minimizing damage to the negative electrode active material itself is demanded.

In one general aspect, a method of producing a negative electrode active material for a secondary battery includes: a) a metal doping process of mixing a silicon-based material and a metal precursor and performing a heat treatment to dope the silicon-based material with a metal; and b) an acid gas treatment process of treating the metal-doped silicon-based material in an acid gas atmosphere to remove residual metal.

In addition, according to one embodiment of the disclosure, the silicon-based material of the metal doping process a) may include a silicon oxide ($SiO_x$, $0<x\leq2$).

In addition, according to an exemplary embodiment of the present invention, the silicon-based material of a) may have a carbon coating layer on part or all of the surface.

In addition, according to an exemplary embodiment of the present invention, the metal doping process a) may be a heat treatment at a temperature of higher than 500° C. and lower than 700° C. under an inert atmosphere.

In addition, according to an exemplary embodiment of the present invention, the metal precursor of the metal doping process a) may include one or more of: metal particles including one or more selected from the group consisting of Li, Na, Mg, and K; and metal hydrides, metal hydroxides, metal oxides, or metal carbonates including one or more selected from the group consisting of Li, Na, Mg, and K.

In addition, according to an exemplary embodiment of the present invention, the acid gas treatment process b) may be performed by including one or more of the following processes b1) to b3):

b1) mixing the metal-doped silicon-based material with an aqueous solution at pH 1 to 9 and bubbling an acid gas in the mixed aqueous solution;

b2) blowing an acid gas in the metal-doped silicon-based material; and b3) washing the metal-doped silicon-based material with water, and then drying the material under an acid gas atmosphere.

In addition, according to an embodiment of this invention, in the process of bubbling the b1) acidic gas, the metal-doped silicon material may be mixed with an aqueous solution of pH 1 to 9 to have a concentration of 0.1 to 70% by weight.

In addition, according to an exemplary embodiment of the present invention, in the process of bubbling an acid gas b1), a flow rate of the acid gas may be 8 to 700 mL/min.

In addition, according to an exemplary embodiment of the present invention, the acid gas of the acid gas treatment process b) may include one or more selected from the group consisting of $CO_2$, COS, $SO_2$, $SO_3$, NO, $N_2O$, $NO_2$, $N_2O_3$, $N_2O_4$, $N_2O_5$, $Cl_2$, HCl, HF, and $H_2S$.

In addition, according to an exemplary embodiment of the present invention, before and after the acid gas treatment process b), the metal-doped silicon-based material may have a rate of increase/decrease in oxygen concentration represented by the following Formula (1) of +1.5% or less:

$$(C2-C1)/C1*100 \qquad (1)$$

wherein C1 is an oxygen concentration in the metal-doped silicon-based material before the acid gas treatment process b), and C2 is an oxygen concentration in the metal-doped silicon-based material after the acid gas treatment process b).

In addition, according to an exemplary embodiment of the present invention, after the acid gas treatment process b), the metal-doped silicon-based material may include 4 wt % or less of the residual metal with respect to the total weight.

In addition, according to an exemplary embodiment of the present invention, the residual metal of the acid gas treatment process b) may include one or more of: metal particles including one or more selected from the group consisting of Li, Na, Mg, and K; and metal hydrides, metal hydroxides, metal oxides, or metal carbonates including one or more selected from the group consisting of Li, Na, Mg, and K.

In addition, according to an exemplary embodiment of the present invention, after the acid gas treatment process b), the metal-doped silicon-based material may include 3.0 wt % or less of the metal carbonate as the residual metal with respect to the total weight.

In addition, the method of producing a negative electrode active material for a secondary battery according to an exemplary embodiment of the present invention may further include c) a drying process of drying the acid gas-treated silicon-based material of b) at 10 to 170° C.

In another general aspect, a negative electrode active material for a secondary battery includes: negative electrode active material particles including a silicon-based material and a metal silicate in at least a part of the silicon-based material, wherein the negative electrode active material particles include 4 wt % or less of residual metal and 30 to 90 wt % of the metal silicate with respect to the total weight.

In addition, according to an exemplary embodiment of the present invention, the metal silicate may include one or more of $Li_2SiO_3$, $Li_2Si_2O_5$, and $Li_4SiO_4$.

In addition, according to an exemplary embodiment of the present invention, the residual metal may include one or more of: metal particles including one or more selected from the group consisting of Li, Na, Mg, and K; and metal hydrides, metal hydroxides, metal oxides, or metal carbonates including one or more selected from the group consisting of Li, Na, Mg, and K.

In addition, according to an exemplary embodiment of the present invention, the negative electrode active material particles may include 3.0 wt % or less of the metal carbonate as the residual metal with respect to the total weight.

In addition, according to an exemplary embodiment of the present invention, the negative electrode active material particles may include 1.5 wt % or less of the metal hydroxide as the residual metal with respect to the total weight.

In still another general aspect, a negative electrode for a secondary battery includes: a negative electrode active material according to an exemplary embodiment of the exemplary embodiments described above.

Other features and aspects will be apparent from the following detailed description, the drawings, and the claims.

DETAILED DESCRIPTION OF EMBODIMENTS

Advantages and features of the present invention and methods to achieve them will be elucidated from exemplary embodiments described below in detail with reference to the accompanying drawings. However, the present invention is not limited to exemplary embodiments disclosed below, but will be implemented in various forms. The exemplary embodiments of the present invention make disclosure of the present invention thorough and are provided so that those skilled in the art can easily understand the scope of the present invention. Therefore, the present invention will be defined by the scope of the appended claims. Detailed description for carrying out the present invention will be provided with reference to the accompanying drawings below.

Regardless of the drawings, the same reference number indicates the same constitutional element, and "and/or" includes each of and all combinations of one or more of mentioned items.

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being "on" or "above" another element, it can be directly on the other element or intervening elements may also be present.

An embodiment of the present invention provides a method of producing a negative electrode active material for a secondary battery. The production method includes: a) a metal doping process of mixing a silicon-based material and a metal precursor and performing a heat treatment to dope the silicon-based material with a metal; and b) an acid gas treatment process of treating the metal-doped silicon-based material in an acid gas atmosphere to remove residual metal.

Meanwhile, the method of producing a negative electrode active material may further include a process of producing the silicon-based material. The process may be, as an example, mixing raw material powder and performing a heat treatment. The mixing of raw material powder may be mixing by appropriately adjusting a mixing ratio between Si powder and $SiO_2$ powder, but the present invention is not limited thereto. Subsequently, the mixed raw material powder may be placed in a furnace under an inert atmosphere, and heat treated at a temperature of lower than 900° C., or lower than 800° C., or 500 to 700° C., or 500 to 650° C.; for 1 to 12 hours or 1 to 8 hours under reduced pressure. The produced silicon compound may be extracted, ground, and pulverized to produce a silicon-based material (particles). Conventionally, in order to produce the silicon-based material, the heat treatment was performed at a high temperature of 900 to 1,600° C., but since in a $SiO_x$ material ($0<x\leq2$) or a SiO material, a c-Si seed grows at a heat treatment temperature of 800° C.; or higher and a crystallite grows clearly at 900° C.; or higher, in the present invention, formation of the c-Si seed and the growth of c-Si may be suppressed in the temperature range to produce an amorphous or microcrystalline silicon-based compound.

In addition, according to one embodiment of the disclosure, a carbon coating layer may be further provided on part or all of the surface of the silicon-based material. According to a non-limiting example of the methods for forming the carbon coating layer, a hydrocarbon gas is introduced into a furnace, and heating to a temperature lower than a heat treatment temperature in producing the silicon-based material is performed to form a carbon coating layer. Specifically, the heat treatment may be performed at a temperature of lower than 800° C.; or 500 to 700° C., or 500 to 650° C.; for 1 to 12 hours or 1 to 8 hours, under reduced pressure or inert gas. Conventionally, the heat treatment was performed at a relatively higher temperature of 800 to 1200° C.; or 800 to 950° C.; for coating the surface of the silicon compound particles with a carbon material, but in this case, a disproportionation reaction of the silicon compound is accelerated due to the additional heat treatment to divide the region into Si and $SiO_x$ ($0<x<2$) or $SiO_2$ region, and it is analyzed that in the silicon compound material, the growth of c-Si is promoted at a temperature of 800° C.; or higher and a size of the Si crystallite is increased. The present invention is characterized in that the growth c-Si is extremely suppressed so that the size of the Si crystallite is immeasurable. When the amorphous or microcrystalline silicon-based compound of the present invention is used, even in the case of performing metal pre-treatment (Li pre-treatment) under the same conditions, the growth of c-Si may be suppressed to a high level, as compared with the silicon-based compound in which crystallites have grown in the conventional art.

Meanwhile, as the hydrocarbon gas, hydrocarbon gas having 3 or less carbon atoms may be used, because manufacturing costs may be reduced and a good coating layer may be formed, but the present invention is not limited thereto. The metal doping process a) is for solving a problem of deterioration of initial efficiency by formation of an irreversible phase of a silicon-based material during initial charging and discharging of a battery, and may be doping at least a part of the silicon-based material with a metal by mixing the silicon-based material and a metal precursor at a specific mixing ratio and performing a heat treatment.

The metal doping process a) may be a heat treatment at higher than 500° C.; and lower than 700° C.; for 1 to 12 hours under an inert atmosphere. When the heat treatment is performed at a temperature of 700° C.; or higher, a disproportionation reaction occurs or growth of a Si crystal is accelerated, so that the growth of c-Si may be inevitably involved, and crystal growth is suppressed when producing a raw material at a temperature lower than 700° C., so that amorphous or microcrystalline silicon oxide particles may be produced. In addition, when the heat treatment is performed at a low temperature of lower than 500° C., a lithium pretreatment effect is rapidly decreased, so that the effect of suppressing crystal phase growth of the silicon oxide particles by the low-temperature heat treatment according to the present invention may not be shown. Meanwhile, in a metal pretreatment, in particular, a Li pretreatment by an electrochemical method or an oxidation-reduction method, a lithium silicate of $Li_4SiO_4$ is likely to be produced, but according to the present invention, a target lithium silicate having a different composition may be synthesized in a high purity by the heat treatment in the above temperature range.

Meanwhile, as the inert atmosphere, a known method in which the inside of a reaction unit is purged with inert gas to create an inert atmosphere may be applied, and the inert gas may be selected from Ne, Ar, Kr, $N_2$, and the like, or may be Ar or $N_2$, but the present invention is not limited thereto.

The metal precursor of the metal doping process a) may include one or more of: metal particles including one or more selected from the group consisting of Li, Na, Mg, and K; and metal hydrides, metal hydroxides, metal oxides, or metal carbonates including one or more selected from the group consisting of Li, Na, Mg, and K. A specific example of the metal precursor may be a Li precursor including at least one selected from LiOH, Li, LiH, $Li_2O$, and $Li_2CO_3$, but is not particularly limited thereto.

In one embodiment of the disclosure, the silicon compound particles and the metal precursor are mixed so that a M/Si (metal/silicon) mole ratio is more than 0.3 and 1.0 or less, specifically more than 0.3 and 0.8 or less, or 0.4 to 0.8, and more or 0.5 to 0.8. In particular, when a Li precursor is used as the metal precursor, an optimal ratio between $Li_2SiO_3$ and $Li_2Si_2O_5$ may be found in the above mixing range, and formation of c-Si and $Li_4SiO_4$ may be suppressed to greatly improve electrochemical performance of a battery.

Subsequently, a product from the heat treatment is recovered and ground, thereby producing a metal-doped silicon-based material. Any known grinding method may be applied as the grinding process, and the present invention is not limited thereto.

The acid gas treatment process b) is for solving problems such as slurry viscosity change over time, hydrogen gas production, and binder deterioration, which arise when a metal-doped silicon-based material is used as a negative electrode active material, by removing residual metal, and the metal-doped silicon-based material of a) may be treated in an acid gas atmosphere to remove residual metal. As an example, the acid gas treatment process b) may be formed by including one or more of the following processes b1) to b3):

b1) mixing the metal-doped silicon-based material with an aqueous solution at pH 1 to 9 and bubbling an acid gas in the mixed aqueous solution;

b2) blowing an acid gas in the metal-doped silicon-based material; and b3) washing the metal-doped silicon-based material with water, and then drying the material under an acid gas atmosphere.

The metal-doped silicon-based material may include the unreacted metal precursor in the process a) as a residual metal, and for example, the lithium-doped silicon-based material may include 1 to 10 wt %, 1 to 5 wt %, or 1 to 3 wt % of the residual metal (lithium) in at least a part of the particles. Since the residual metal may cause problems such as slurry viscosity change over time, hydrogen gas production, and binder deterioration during negative electrode slurry production, a method of effectively removing the residual metal is needed.

The process of bubbling an acid gas b1) may be mixing the metal-doped silicon-based material with an aqueous solution at pH 1 to 9 and bubbling an acid gas in the mixed aqueous solution.

When conventionally, the silicon-based material is directly immersed in a high-concentration acid solution or strong acid solution and washed, a microstructure of the silicon-based material to be washed may be changed to cause surface damage, so that the metal doping of the silicon-based material, for example, lithium silicate is lost to deteriorate initial charge and discharge efficiency of a battery. Considering the above description, according to according to one embodiment of the disclosure, the aqueous solution may be a pure aqueous solution or a low-concentration weak acid aqueous solution, for example, an aqueous solution at pH 2 to 8, or pH 2.5 to 7.5, or pH 4 to 7. The pure aqueous solution or low-concentration weak acid aqueous solution may be water, a 0.05 to 0.8 M acetic acid aqueous solution, a formic acid aqueous solution, a cyanic acid aqueous solution, a fluoric acid aqueous solution, a sulfuric acid aqueous solution, a hydrochloric acid aqueous solution, a phosphoric acid aqueous solution, a citric acid aqueous solution, a tannic acid aqueous solution, a hydrogen sulfide aqueous solution, a trichloroacetic acid aqueous solution, or a combination thereof, but the present invention is not limited thereto.

According to an example, in the process of bubbling an acid gas b1), the metal-doped silicon-based material may be mixed at a washing concentration of 0.1 to 70 wt %, or 1 to 60 wt %, and more or 5 to 30 wt % with the pure solution or low-concentration weak acid aqueous solution. When a concentration mixed in the aqueous solution of the silicon-based material (washing concentration) is excessively high, the pH is increased due to an increase in the amount of eluted residual lithium, so that a residual lithium control effect of the solution may not be shown, and on the other hand, when the concentration is excessively low below the concentration range, the recovery rate of the silicon-based material after filtration drops and costs for waste water treatment of the mixed solution versus the post-treatment effect are increased, so that it is difficult to secure process economic feasibility.

The treatment time of the acid gas treatment process (washing time) may be 8 to 150 minutes, or 8 to 70 minutes, or 15 to 70 minutes. When the washing time exceeds the range, the silicon-based negative electrode active material is damaged by excessive washing to decrease capacity and efficiency. When the washing time is less than the range, the effect of controlling the content of residual lithium may not be sufficiently shown.

When the acid gas is bubbled or blown, the flow rate of the acid gas may be 8 to 700 mL/min, or 15 to 700 mL/min. When the flow rate of the acid gas exceeds the range, a residual lithium compound reacts with $CO_2$ to produce an excessive amount of $Li_2CO_3$, and when the residual lithium compound reacts with water to be more than the amount to be further removed, deterioration of the capacity and efficiency of the silicon-based material and gas production during charge and discharge may be worse. When the flow rate of the acid gas is less than the above range, a technical advantage for an increased washing effect due to the acid gas may not be secured. Any acid gas atmosphere is fine as long as it includes an acid gas, and its composition is not particularly limited. For example, the acid gas atmosphere may include an acid gas and one or more of air, $O_2$, $N_2$, and Ar gas. The acid gas may include one or more selected from the group consisting of $CO_2$, COS, $SO_2$, $SO_3$, NO, $N_2O$, $NO_2$, $N_2O_3$, $N_2O_4$, $N_2O_5$, $Cl_2$, HCl, HF, and $H_2S$, and may include $CO_2$.

According to an example, the purity of the acid gas atmosphere may be 85 vol % or more or 90 vol % or more, but is not particularly limited thereto.

According to an example, the pressure conditions of the acid gas atmosphere may be 1 bar or more or 1 bar to 6 bar, but is not particularly limited thereto.

The principle of removal of residual lithium (LiOH, $Li_2CO_3$) present in the lithium-doped silicon-based material when $CO_2$ is included as the acid gas will be described with reference to the following Reaction Formulae 1 and 2, but it should be noted that this is an example to aid understanding, and does not particularly limit the technical idea of the present invention:

$$2LiOH+CO_2 \rightarrow Li_2CO_3+H_2O \quad \text{[Reaction Formula 1]}$$

$$Li_2CO_3+CO_2+H_2O \rightarrow 2LiHCO_3 \quad \text{[Reaction Formula 2]}$$

Referring to Reaction Formulae 1 and 2, among the residual metal, LiOH reacts with an acid gas $CO_2$ which is injected into the aqueous solution to produce $Li_2CO_3$, and the produced $Li_2CO_3$ reacts with dissolved $CO_2$ again to be present in the aqueous solution (washing solution) phase in the form of $LiHCO_3$. This reaction accelerates a rate at which the residual metal is eluted and the residual metal eluted in the aqueous solution may be removed later with the aqueous solution. This means that a high-performance negative electrode active material in a state that the content of residual lithium is excellently controlled and a raw material is not damaged may be produced by the acid gas $CO_2$ treatment.

In particular, though it is intended to remove residual lithium by immersing a negative electrode active material in a high-concentration weak acid solution or strong acid solution, only the reaction of Reaction Formula 1 occurs, so that a metal carbonate among the residual lithium still remains in a large amount on the surface of the active material.

Before and after the acid gas treatment process b), according to an example, the metal-doped silicon-based material may have a rate of increase/decrease in oxygen concentration represented by the following Formula (1) of +1.5% or less:

$$(C2-C1)/C1*100 \quad (1)$$

wherein C1 is an oxygen concentration in the metal-doped silicon-based material before the acid gas treatment process b), and C2 is an oxygen concentration in the metal-doped silicon-based material after the acid gas treatment process b).

That is, the rate of increase/decrease in oxygen concentration (Formula (1)) may be a percentage of a difference in oxygen concentration before and after the acid gas treatment process b) (C2−C1) of the metal-doped silicon-based material to the oxygen concentration before the acid gas treatment process b) (C1) of the metal-doped silicon-based material.

When the rate of increase/decrease in oxygen concentration is more than +1.5%, an excessive amount of silicon oxide or lithium carbonate is produced on the surface of active material particles, so that surface reactivity may be suppressed during negative electrode slurry production to suppress slurry gelation, but it is not preferred in that an effect of suppressing slurry gelation is very temporary and a decrease in initial efficiency and capacity may follow. In addition, the content of residual lithium such as lithium and an inactive lithium compound (such as lithium hydroxide and lithium carbonate) is increased to cause a violent reaction with water during slurry production. This may accelerate slurry gelation and increase the amount of gas produced, and this phenomenon leads to a decrease in initial efficiency and capacity. Therefore, it is not preferred to excessively increase the rate of increase/decrease in oxygen concentration of the active material.

Meanwhile, when the rate of increase/decrease in oxygen concentration is excessively low, lithium silicate is dissolved by the acid gas treatment process to cause deterioration of active material performance, which is thus not preferred. Therefore the rate of increase/decrease in oxygen concentration may be −3.0 to +1.5%, or −2.5 to +1.5%.

The oxygen concentration may refer to a content (wt %) of each element in the metal-doped silicon-based material (negative electrode active material), and an example of a measurement method may include a measurement method using a high frequency inductively coupled plasma (ICP) spectrometer, Optima 8300 available from Perkin Elmer.

Meanwhile, the residual metal of the acid gas treatment process b), may include, according to an example, one or more of: metal particles including one or more selected from Li, Na, Mg, and K; and metal hydrides, metal hydroxides, metal oxides, or metal carbonates including one or more selected from the group consisting of Li, Na, Mg, and K, according to a specific example, metal hydroxides, metal carbonates, or combinations thereof, and according to a more specific example, a metal carbonate. The residual metal may cause slurry viscosity change over time, hydrogen gas production, binder deterioration, and the like, as described above.

In addition, according to an example, after the acid gas treatment process b), the metal-doped silicon-based material may include 4 wt % or less, or 3.5 wt % or less, or 2.5 wt % or less, 2.0 wt % or less, 1.5 wt % or less, 1.0 wt % or less, or 0.6 wt % or less, or 0.5 wt % or less, 0.4 wt % or less, 0.3 wt % or less, or 0.2 wt % or less of the residual metal with respect to the total weight. Thus, problems which may arise from the residual metal as described above may be solved. The residual metal may include examples of the residual metal described above, and a non-limiting example of the residual metal may include $Li_2CO_3$ and LiOH.

In addition, after the acid gas treatment process b), the metal-doped silicon-based material may include 3.0 wt % or less, more than 0 wt % and 3.0 wt % or less, or 0.02 to 3.0 wt %, or 0.04 to 2.5 wt %, or 0.04 wt % to 1.3 wt % of the metal carbonate with respect to the total weight. This means that the content of residual lithium may be excellently controlled by the acid gas treatment as compared with the case of a treatment of directly immersing a negative electrode active material in a strong acid solution. The metal carbonate may include carbonates of the residual metal described above, and a non-limiting example of the metal carbonate may include $Li_2CO_3$.

A method of producing a negative electrode active material for a secondary battery according to an example of the present invention may further include: c) a drying process of drying the acid gas-treated silicon-based material of b) at 10 to 170° C. Specifically, the drying process may be performed in an oven at a temperature of 10 to 140° C.; or 20 to 110° C., or 25 to 60° C.; for 1 to 48 hours, or 10 to 24 hours.

When the silicon-based compound is dried in a temperature range of less than 10° C., it may be difficult to completely dry the moisture, and in a temperature range of higher than 170° C., deterioration of an active material may occur due to deterioration of thermal stability of a Li compound.

Another embodiment provides a negative electrode active material for a secondary battery. The negative electrode active material includes negative electrode active material particles including: a silicon-based material; and a metal silicate in at least a part of the silicon-based material, wherein the negative electrode active material particles include 4 wt % or less of the residual metal and 30 to 90 wt % of the metal silicate with respect to the total weight.

The silicon-based material may include a silicon oxide ($SiO_x$, $0<x\leq 2$), and the same description as the "silicon-based material" above may be applied, and thus, the description will be omitted for convenience.

The metal silicate may include one or more of lithium silicate, sodium silicate, potassium silicate, and magnesium silicate. The metal silicate may include, as an example, one or more of $Li_2SiO_3$, $Li_2Si_2O_5$, and $Li_4SiO_4$, and in order to improve the problem that a silicon oxide is converted into an irreversible phase during initial charge and discharge, according to one embodiment of the disclosure, may include one or more of $Li_2SiO_3$ and $Li_2Si_2O_5$.

The metal silicate may be included at 30 to 90 wt % or 50 to 90 wt % with respect to the total weight of the negative electrode active material particles. In addition, the residual metal may be included at 4 wt % or less or 3.5 wt % or less, or 2.5 wt % or less, 2.0 wt % or less, 1.5 wt % or less, 1.0 wt % or less, or 0.6 wt % or less, or 0.5 wt % or less, 0.4 wt % or less, 0.3 wt % or less, or 0.2 wt % or less, with respect to the total weight of the negative electrode active material particles. Thus, the metal silicate may be formed at a relatively high content to solve an initial irreversible phase conversion problem and also improve a problem arising from the residual metal.

Since the residual metal (residual lithium) is the same as those described in the method of producing a negative electrode active material by an embodiment of the present invention, the description will be omitted for convenience.

The lithium compound mainly present on the surface of particles may be removed during washing by directly immersing the negative electrode active material in a strong acid solution, but the content of metal carbonates (such as $Li_2CO_3$, $Na_2CO_3$, and $MgCO_3$) as the residual metal may be increased. However, according to an exemplary embodiment of the present invention, the metal carbonates as the residual metal may be effectively reduced without damage to the negative electrode active material, and according to an example, the content of the metal carbonates as the residual metal may be 3.0 wt % or less, more than 0 wt % and 3.0 wt % or less, or 0.02 to 3.0 wt %, or 0.04 to 2.5 wt %, or 0.4 to 1.3 wt %, with respect to the total weight of the negative electrode active material particles. When the content of $Li_2CO_3$ is more than 3.0 wt %, a reaction between a Li ion and the active material is suppressed due to excessive $Li_2CO_3$, thereby decreasing initial efficiency, and $Li_2CO_3$ is brought into contact with moisture in the atmosphere or $H_2O$ during slurry production to form LiOH again. However, when washing is excessive, the metal silicate forming the material may be partly removed (etched) together, so that initial efficiency may be decreased with the decrease in capacity, and thus, the content of the metal carbonate may be 0.02 wt % or more.

According to an example, the content of the metal hydroxide (such as LiOH, NaOH, and $Mg(OH)_2$) as the residual metal may be 1.5 wt % or less, more than 0 wt % and 1.5 wt % or less, or 0.005 to 1.5 wt %, or 1.0 wt % or less, more than 0 wt % and 1.0 wt % or less, or 0.005 to 1.0 wt %, and more or 0.7 wt % or less, more than 0 wt % and 0.7 wt % or less, or 0.005 to 0.7 wt %, with respect to the total weight of the negative electrode active material particles. As an example, when the content of LiOH is more than 1.5 wt %, a slurry gels by a violent reaction with moisture in the atmosphere or $H_2O$ during slurry production, the viscosity may be decreased, and also, a safety problem may arise during electrode storage due to a large amount of gas produced.

When the residual metal (residual lithium) is removed by directly immersing the negative electrode active material in a strong acid solution, like in the conventional art, the metal silicate formed on the surface of the silicon-based material may be partly etched, so that the specific surface area of the silicon-based material is increased, and thus, an electrolyte solution side reaction occurs and initial efficiency may be decreased. In the present invention, since an acid gas is injected into a pure water solution or a low-concentration weak acid during residual metal washing, etching or loss of the doping metal (metal silicate), which may occur previously by directly immersing the negative electrode active material in a strong acid solution, may not substantially occur.

The negative electrode active material particles may have an average particle size of 2 to 30 μm, to 7 to 10 μm, and within the range, volume expansion of the negative electrode active material particles during insertion/desorption of a Li ion may be decreased to suppress electrode deterioration. Herein, the average particle size of the negative electrode active material particles may refer to D50, and the D50 refers to a diameter of a particle with a cumulative volume of 50% when cumulated from the smallest particle in measurement of a particle size distribution by a laser scattering method. Herein, D50 may be obtained by collecting a sample for the produced carbonaceous material according to the standard of KS A ISO 13320-1 and measuring a particle size distribution, using Mastersizer 3000 from Malvern Panalytical Ltd. Specifically, a volume density may be measured after dispersion is performed using ethanol as a solvent, and, if necessary, using an ultrasonic disperser.

Another embodiment provides a negative electrode active material for a secondary battery produced by the method of producing a negative electrode active material for a secondary battery of the present invention. The negative electrode active material may be the same negative electrode active material according to another embodiment described above, but is not particularly limited.

Another embodiment provides a negative electrode for a secondary battery including the negative electrode active material according to an exemplary embodiment of the exemplary embodiments described above. As a non-limiting example, the negative electrode may include a current collector; the negative electrode active material placed on the current collector; and a water-based binder.

The current collector may be selected from the group consisting of a copper foil, a nickel foil, a stainless steel foil, a titanium foil, a nickel foam, a copper foam, a polymer substrate coated with a conductive metal, and a combination thereof, but is not limited thereto.

The negative electrode active material layer includes the negative electrode active material and the water-based binder, and optionally, may further include a conductive material.

The negative electrode active material includes negative electrode active material particles including: the silicon-based material; and a metal silicate in at least a part of the silicon-based material, and optionally, may further include a material capable of reversibly inserting/desorbing a lithium ion, a lithium metal, an alloy of a lithium metal, a material which may be doped and dedoped with lithium, or a transition metal oxide.

The negative electrode active material particles are as described above.

An example of the material capable of reversibly inserting/desorbing a lithium ion may include a carbon material, that is, a carbon-based negative electrode active material which is commonly used in the lithium secondary battery. A representative example of the carbon-based negative electrode active material may include crystalline carbon, amorphous carbon, or a combination thereof. An example of the crystalline carbon may include graphite such as amorphous, plate-shaped, flake-shaped, spherical, or fibrous natural graphite or artificial graphite, and an example of the amorphous carbon may include soft carbon or hard carbon, a mesophase pitch carbide, calcined coke, and the like.

The alloy of the lithium metal may be an alloy of lithium with a metal selected from the group consisting of Na, K, Rb, Cs, Fr, Be, Mg, Ca, Sr, Si, Sb, Pb, In, Zn, Ba, Ra, Ge, Al, and Sn.

The material capable of doping or dedoping with lithium may be a silicon-based material, for example, Si, $SiO_x$ ($0<x<2$), a Si-Q alloy (Q is an element selected from the group consisting of alkali metals, alkaline earth metals, Group 13 elements, Group 14 elements, Group 15 elements, Group 16 elements, transition metals, rare-earth elements, and combinations thereof, but is not Si), a Si-carbon composite, Sn, $SnO_2$, a Sn—R alloy (R is an element selected from the group consisting of alkali metals, alkaline earth metals, Group 13 elements, Group 14 elements, Group 15 elements, Group 16 elements, transition metals, rare-earth elements, and combinations thereof, but is not Sn), a Sn-carbon composite, and the like, and also, a mixture of at least one thereof and $SiO_2$ may be used. The elements Q and R may be selected from the group consisting of Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may be a lithium titanium oxide.

In the negative electrode active material, the negative electrode active material particles may be included at 50 wt % or more, or 60 wt % or more or 70 wt % or more, or 80 wt % or more or 90 wt % or more, and as an example, 100 wt %, with respect to the total weight of the negative electrode active material.

The water-based binder serves to attach negative electrode active material particles to each other well and to attach the negative electrode active material to the current collector well. The water-based binder may be polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, ethylene-propylene-diene polymer (EPDM), sulfonated-EPDM, styrene-butadiene rubber (SBR), fluorine rubber, various copolymers thereof, and the like, and specifically, the binder may include a binder formed of carboxymethyl cellulose (CMC), styrene-butadiene rubber (SBR), and a mixture thereof.

The conductive material is used for imparting conductivity to an electrode, and any conductive material may be used as long as it is an electroconductive material which does not cause a chemical change in the battery to be configured. As an example of the conductive material, conductive materials including a carbon-based material such as natural graphite, artificial graphite, carbon black, acetylene black, ketjen black, and carbon fiber; a metal-based material such as metal powder or metal fiber of copper, nickel, aluminum, silver, and the like; a conductive polymer such as a polyphenylene derivative; or a mixture thereof may be used.

Each of the contents of the binder and the conductive material in the negative electrode active material layer may be 1 to 15 wt % or 1 to 10 wt %, or 1 to 5 wt %, with respect to the total weight of the negative electrode active material layer, but is not particularly limited thereto.

Another embodiment provides a lithium secondary battery including: the negative electrode; a positive electrode; a separator placed between the negative electrode and the positive electrode; and an electrolyte solution.

The negative electrode is as described above.

The positive electrode includes a current collector, and a positive electrode active material layer formed by applying a positive electrode slurry including a positive electrode active material on the current collector.

The current collector may be a negative electrode current collector described above, and any known material in the art may be used, but the present invention is not limited thereto.

The positive electrode active material layer includes a positive electrode active material, and optionally, may further include a binder and a conductive material. The positive electrode active material may be any known positive electrode active material in the art, and for example, it is a composite oxide of lithium with a metal selected from cobalt, manganese, nickel, and a combination thereof, but the present invention is not limited thereto.

The binder and the conductive material may be the negative electrode binder and the negative electrode conductive material described above, and any known material in the art may be used, but the present invention is not limited thereto.

The separator may be selected from glass fiber, polyester, polyethylene, polypropylene, polytetrafluoroethylene, or a combination thereof, and may be in the form of nonwoven or woven fabric. For example, in the lithium secondary battery, a polyolefin-based polymer separator such as polyethylene or polypropylene may be mainly used and a separator coated with a composition including a ceramic component or a polymer material may be used for securing thermal resistance or mechanical strength, and optionally, the separator may be used in a single layer or a multilayer structure, and any known separator in the art may be used, but the present invention is not limited thereto.

The electrolyte solution includes an organic solvent and a lithium salt.

The organic solvent serves as a medium in which ions involved in the electrochemical reaction of a battery may move, and for example, may include carbonate-based, ester-based, ether-based, ketone-based, alcohol-based, or aprotic solvents, and as a specific example, may include ethylene carbonate (EC), ethyl methyl carbonate (EMC), dimethyol carbonate (DMC), and the like, but is not particularly limited thereto. The organic solvent may be used alone or in combination of two or more, and when used in combination of two or more, the mixing ratio may be appropriately adjusted depending on the performance of a battery to be desired. Any organic solvent known in the art may be used, but the present invention is not limited the examples described above.

The lithium salt is a material, which is dissolved in the organic solvent and acts as a source of lithium ions in the battery to allow basic operation of the lithium secondary battery, and promotes movement of lithium ions between a positive electrode and a negative electrode. An example of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof, but the present invention is not limited thereto.

A concentration of the lithium salt may be in a range of 0.1 M to 2.0 M. When the lithium salt concentration is within the range, the electrolyte solution has appropriate conductivity and viscosity, and thus, excellent electrolyte solution performance may be shown and lithium ions may effectively move.

In addition, the electrolyte solution may further include pyridine, triethylphosphate, triethanolamine, cyclic ether, ethylene diamine, n-glyme, hexamethyl phosphate triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, aluminum trichloride, and the like, if necessary, for improving charge and discharge characteristics, flame retardant characteristics, and the like. In some cases, a halogen-containing solvent such as carbon tetrachloride and ethylene trifluoride may be further included for imparting non-flammability, and fluoro-ethylene carbonate (FEC), propene sultone (PRS), fluoro-propylene carbonate (FPC), and the like may be further included for improving conservation properties at a high temperature.

The method of producing a lithium secondary battery according to the present invention for achieving the above object may include laminating a negative electrode, a separator, and a positive electrode which are produced in this order to form an electrode assembly, placing the produced electrode assembly in a cylindrical battery case or an angled battery case, and then injecting an electrolyte solution, thereby producing a battery. Otherwise, the battery may be produced by laminating the electrode assembly, immersing the assembly in an electrolyte solution, placing the resultant product in a battery case, and sealing the case.

As the battery case used in the present invention, those commonly used in the art may be adopted, there is no limitation in appearance depending on the battery use, and for example, a cylindrical shape, an angled shape, a pouch shape, a coin shape, or the like using a can may be used.

The lithium secondary battery according to the present invention may be used in a battery cell used as a power supply of a small device, and also may be used as a unit cell in a medium or large battery module including a plurality of battery cells. An example of the medium or large device may include an electric automobile, a hybrid electric automobile, a plug-in hybrid electric automobile, a system for power storage, and the like, but is not limited thereto.

Hereinafter, the examples and the comparative examples of the present invention will be described. However, the following examples are only one embodiment of the present invention, and the present invention is not limited thereto.

EXAMPLES

Example 1

(Production of Negative Electrode Active Material)

a) Metal Doping Process

A raw material in which a silicon metal and silicon dioxide were mixed was introduced to a reaction furnace and evaporated in the atmosphere of a vacuum degree of 10 Pa to obtain a product, which was deposited on a suction plate and sufficiently cooled, and then a deposit was taken out and ground with a ball mill to prepare a silicon-based material (particles). Continuously, a particle diameter of the silicon-based material was adjusted by classification. Thereafter, pyrolysis CVD was performed to coat the surface of the silicon-based material with a carbon coating layer. At this time, the average thickness of the carbon coating layer was 100 nm, and the entire average particle diameter (D50) of the silicon-based material coated with the carbon coating layer was 8 μm.

The silicon-based material produced and LiOH powder were mixed at a Li/Si mole ratio of 0.3 to 1.0 to form mixed powder, and the mixed powder and a zirconia ball (1-20 times the mixed powder) were placed in an airtight container and mixed using a shaker for 30 minutes. Thereafter, the mixed powder was filtered using a sieve of 25-250 μm and then placed in an alumina crucible.

The aluminum crucible was heat-treated in a furnace under a nitrogen gas atmosphere for 1-12 hours. Subsequently, the heat-treated powder was recovered and ground in a mortar to produce negative electrode active material particles including a silicon oxide ($SiO_x$) and a lithium silicate (such as $Li_2Si_2O_5$ and $Li_2SiO_3$).

b) Acid Gas Treatment Process

A negative electrode active material to be washed was mixed at a washing concentration of 12 wt % in purified water, an acid gas ($CO_2$ gas) was injected at a flow rate of 300 ml/min into the purified water, and stirring was performed at 50 to 500 rpm for 30 minutes while generating bubbles.

Thereafter, a negative electrode active material was filtered well, and dried under vacuum for 1 to 24 hours to produce a final negative electrode active material.

(Production of Negative Electrode Slurry and Negative Electrode)

The negative electrode active material produced, a conductive agent, carbon black (super P), and a water-based binder (polyacrylic acid) were dispersed in an aqueous solution at a weight ratio of 8:1:1 to produce a negative electrode slurry.

The negative electrode slurry produced was applied on a Cu foil, and dried under vacuum at 80 to 160° C.; for 1 to 24 hours to produce a negative electrode.

(Production of Half Battery)

The produced negative electrode and a lithium metal as a counter electrode were used, a PE separator was interposed between the negative electrode and the counter electrode, an electrolyte solution was injected thereto, and a coin cell (CR2032) was assembled. The assembled coin cell was paused at room temperature for 3 to 24 hours to produce a half battery. At this time, the electrolyte solution was obtained by mixing 1.0 M $LiPF_6$ as a lithium salt with an organic solvent (EC:EMC=3:7 vol %) and mixing 2 vol % of FEC 2 as an electrolyte additive.

Ref.

A negative electrode active material, a negative electrode slurry, a negative electrode, and a half battery were produced in the same manner as in Example 1, except that the acid gas treatment process b) of Example 1 was not performed.

Example 2

A negative electrode active material, a negative electrode slurry, a negative electrode, and a half battery were produced in the same manner as in Example 1, except that in the acid gas treatment process b), a negative electrode active material to be washed was added to the reactor produced under the following production conditions, and $CO_2$ gas was blown at 300 ml/min into the reactor without using a washing solution.

The reactor was configured as a cylindrical container having a structure in which the upper and the lower portions may be sealed, was equipped with a fiber filter including pores on the lower portion to prevent active material loss, and allowed a residual washing solution to be discharged through the filter. The upper structure was manufactured to be equipped with a gas inlet including a pressure gauge to allow gas injection so that appropriate pressure was confirmed.

Example 3

A negative electrode active material, a negative electrode slurry, a negative electrode, and a half battery were produced in the same manner as in Example 1, except that in the acid gas treatment process b), water washing was performed without bubbling or blowing of $CO_2$ gas in the washing, and the negative electrode active material was filtered well and dried at room temperature under a $CO_2$ atmosphere (purity: >90 vol %, pressure: 1 to 3 bar) to produce the negative electrode active material.

Examples 4 and 5

Negative electrode active materials, negative electrode slurries, negative electrodes, and half batteries were produced in the same manner as in Example 1, except that in the acid gas treatment process b), washing was performed at washing concentrations described in Table 3 of Evaluation Example 3.

Examples 6 and 7

Negative electrode active materials, negative electrode slurries, negative electrodes, and half batteries were produced in the same manner as in Example 1, except that in the acid gas treatment process b), washing was performed at gas flow rates described in Table 4 of Evaluation Example 4.

Examples 8 and 9

Negative electrode active materials, negative electrode slurries, negative electrodes, and half batteries were produced in the same manner as in Example 1, except that in the acid gas treatment process b), washing was performed for washing time described in Table 5 of Evaluation Example 5.

Examples 10 and 11

Negative electrode active materials, negative electrode slurries, negative electrodes, and half batteries were produced in the same manner as in Example 1, except that the washing solutions described in Table 6 of Evaluation Example 6 were applied as the washing solution used in the acid gas treatment process b).

Comparative Examples 1 to 3

Negative electrode active materials, negative electrode slurries, negative electrodes, and half batteries were produced in the same manner as in Example 1, except that in the acid gas treatment process b), washing was performed only with purified water without injecting $CO_2$ gas (Comparative Example 1) or air or air gas was injected instead of $CO_2$ gas after mixing with purified water (Comparative Examples 2 and 3).

Comparative Example 4

A negative electrode active material, a negative electrode slurry, a negative electrode, and a half battery were produced in the same manner as in Example 1, except that in the acid gas treatment process b), washing was performed at a washing concentration described in Table 3 of Evaluation Example 3.

Comparative Example 5

A negative electrode active material, a negative electrode slurry, a negative electrode, and a half battery were produced in the same manner as in Example 1, except that in the acid gas treatment process b), washing was performed at a gas flow rate described in Table 4 of Evaluation Example 4.

Comparative Example 6

A negative electrode active material, a negative electrode slurry, a negative electrode, and a half battery were produced in the same manner as in Example 1, except that in the acid gas treatment process b), washing was performed for washing time described in Table 5 of Evaluation Example 5.

Comparative Examples 7 to 10

Negative electrode active materials, negative electrode slurries, negative electrodes, and half batteries were produced in the same manner as in Comparative Example 1, except that the washing solutions described in Table 6 of Evaluation Example 6 were applied as the washing solution used in the acid gas treatment process b).

Evaluation Example

Each physical property value in the following evaluation examples was measured by the following method.

Method of Measuring Content of Residual Metal (Lithium) ($Li_2CO_3$, LiOH)

Negative electrode active materials of each of the examples, ref., and the comparative examples which were produced at a concentration of 0.5 to 5 wt % were mixed with purified water, stirring was performed at 200 to 800 RPM for 5 to 30 minutes, filtration was performed, and titration was performed using a HCl solution to calculate the content of the residual metal (lithium) ($Li_2CO_3$, LiOH) by the volume of HCl required for titration.

Method of Measuring pH of Negative Electrode Slurry

PH of the negative electrode slurry produced in each of the examples, ref. and the comparative examples was measured.

Method of Measuring Amount of Gas Produced (%)

Air bubbles of the negative electrode slurry produced in each of the examples, ref., and the comparative examples were removed as much as possible, the negative electrode slurry was added to a sealable cylindrical container, the container was sealed and allowed to stand for 24 hours, and the increased volume of the cylindrical container (quantifying a pushed degree of a compression bar in the cylinder) was measured to determine a percentage of the increased volume to the initial volume of the cylindrical container, thereby deriving the amount of gas produced.

Method of Measuring Discharge Capacity and Initial Efficiency

A half battery produced in each of the examples, ref., and the comparative examples was charged at room temperature (25° C.) with constant current until the voltage reached 0.01 V (vs. Li) at a current of 0.1 C rate, and then was charged with a constant voltage by cut-off at a current of 0.01 C rate while maintaining 0.01 V in a constant voltage mode. The battery was discharged with a constant current of 0.1 C rate until the voltage reached 1.5 V (vs. Li) to measure the (initial) discharge capacity and the initial efficiency.

Method of Measuring Rate of Viscosity Change Over Time

The viscosity of the negative electrode slurry produced in each of the examples, ref. and the comparative examples was measured in a slurry viscosity meter (manufacturer: Malvern Panalytical, product name: Rheometer) while stirring at 30 RPM, and after 24 hours, the viscosity was measured again to measure the rate of viscosity change over time.

Method of Measuring Rate of Increase/Decrease in Oxygen Concentration

The oxygen (O) concentration (%) of the negative electrode active material produced in each of the examples and ref. was measured by ICP analysis, and the rate of increase/decrease in oxygen (O) concentration was derived by the following Formula (1):

$$(C2-C1)/C1*100 \quad (1)$$

wherein C1 is an oxygen concentration in the metal-doped silicon-based material before the acid gas treatment process b), and C2 is an oxygen concentration in the metal-doped silicon-based material after the acid gas treatment process b).

In Formula (1), 0 concentration of the ref. negative electrode active material was substituted into the C1 value. ref. Since the ref. negative electrode active material was not subjected to the acid gas treatment process b), it was regarded as the oxygen concentration of the negative electrode active material before performing the oxygen gas treatment process b) (or which was not subjected to the process). In Formula (1), the 0 concentration of the negative electrode active material of each of the examples in which the process b) was performed was substituted into the $C_2$ value.

Evaluation Example 1: Evaluation of Washing Effect Depending on Type of Acid Gas Treatment Process In order to evaluate the washing effect depending on the type of the acid gas treatment process, the results of evaluating ref. and Examples 1 to 3 are shown in the following Table 1:

TABLE 1

| | Washing solution | Gas injection method | Washing concentration [wt %] | Washing time [min] | Drying method | $Li_2CO_3$ [wt %] | LiOH [wt %] | Slurry pH | Amount of gas produced [%] | Discharge capacity [mAh/g] | Initial efficiency [%] |
|---|---|---|---|---|---|---|---|---|---|---|---|
| ref. | — | — | — | — | — | 0.611 | 1.378 | 12.1 | 180 | 1312 | 85.5 |
| Example 1 | $H_2O$ | Bubbling ($CO_2$) | 12 | 30 | Vacuum | 0.205 | 0.014 | 8.8 | — | 1340 | 86.1 |
| Example 2 | — | Blowing ($CO_2$) | — | 30 | Vacuum | 1.025 | 1.044 | 11.4 | 40 | 1343 | 87.3 |
| Example 3 | $H_2O$ | — | 12 | 30 | CO2 | 2.954 | 0.012 | 9.3 | 20 | 1340 | 85.4 |

Referring to the results of Table 1, in Example 1, the contents of LiOH and $Li_2CO_3$ in the residual metal were all decreased, and in Examples 2 and 3, the content of LiOH was greatly decreased, but the content of $Li_2CO_3$ was slightly increased.

Upon comparison of the results of Example 1 with the results of Examples 2 and 3, it was confirmed that in Example 1 in which $CO_2$ gas was bubbled, the content of residual lithium and slurry pH were further decreased.

Evaluation Example 2: Evaluation of Washing Effect Depending on Whether Acid Gas was Applied In order to evaluate the washing effect depending on whether the acid gas was applied, the results of evaluating ref., Example 1, and Comparative Examples 1 to 3 are shown in the following Table 1:

TABLE 2

| | Washing solution | Gas injection method | $Li_2CO_3$ [wt %] | LiOH [wt %] | Slurry pH | Amount of gas produced [%] | Rate of viscosity change over time [%] | Discharge capacity [mAh/g] | Initial efficiency [%] |
|---|---|---|---|---|---|---|---|---|---|
| ref. | — | — | 0.611 | 1.378 | 12.1 | 180 | 76 | 1312 | 85.5 |
| Example 1 | $H_2O$ | Bubbling ($CO_2$) | 0.205 | 0.014 | 8.8 | — | 3 | 1340 | 86.1 |
| Comparative Example 1 | $H_2O$ | — | 0.329 | 1.222 | 11.4 | ≥150 | 25 | 1322 | 85.8 |
| Comparative Example 2 | $H_2O$ | Bubbling (air) | 0.450 | 1.130 | 12.2 | ≥120 | 35 | 1320 | 83.5 |
| Comparative Example 3 | $H_2O$ | Bubbling (Ar) | 0.284 | 1.211 | 12.3 | ≥150 | 26 | 1323 | 85.9 |

Referring to the following Reaction Formulae 1 and 2, LiOH reacted with $CO_2$ to produce $Li_2CO_3$ (Reaction Formula 1), and the produced $Li_2CO_3$ reacted with dissolved $CO_2$ to be present in the form of $LiHCO_3$ in the washing solution (Reaction Formula 2). It is analyzed that a rate at which residual lithium was dissolved was increased by the reaction, and then the residual lithium was removed with the washing solution, and thus, a lower content of residual lithium was present in Example 1 after the washing.

$$2LiOH+CO_2 \rightarrow Li_2CO_3+H_2O \quad \text{[Reaction Formula 1]}$$

$$Li_2CO_3+CO_2+H_2O \rightarrow 2LiHCO_3 \quad \text{[Reaction Formula 2]}$$

When $CO_2$ gas was blown without a washing solution (Example 2) or drying was performed under an acid gas ($CO_2$) atmosphere after the water washing (Example 3), it was confirmed that the content of LiOH was greatly decreased by the reaction of Reaction Formula 1, but the content of $Li_2CO_3$ was slightly increased.

Referring to the above results, LiOH was effectively greatly decreased in all of Examples 1 to 3, and thus, the amount of gas produced was small or gas was not produced, and electrochemical properties of good discharge capacity and initial efficiency were shown. In particular, in Example 1 in which $CO_2$ gas was bubbled, the amount of gas produced was 0% in which no gas was produced, and the electrochemical properties of discharge capacity and initial efficiency were better than those of Examples 2 and 3.

Referring to the results of Table 2, when the metal-doped silicon oxide was synthesized, both the residual lithium and the pH of the raw material were decreased by a certain amount in Example 1 in which the acid gas treatment process b) (washing process-drying process) was performed.

However, in Comparative Example 1 in which the $CO_2$ treatment was not applied and washing with purified water was performed, the decreased amount of the content of residual lithium was not large, and in Comparative Example 2 or 3 in which the acid gas (002 gas) was changed to air or Ar gas, it was analyzed that a decrease in a content of residual lithium was very small and the pH was also equivalent, and all of Comparative Examples 1 to 3 had large amounts of gas produced.

In addition, referring to Table 2, Example 1 had improved discharge capacity and initial efficiency as compared with Comparative Examples 1 to 3, and it is analyzed that this is because as the residual lithium was decreased, hydrogen gas production which may occur by reacting the residual lithium, the electrode composition, and water during water-based slurry production was suppressed, and when being left for 24 hours, the rate of viscosity change over time was also significantly decreased. That is, the residual metal (lithium) on the surface of the active material was efficiently washed by the acid gas treatment process according to the present invention, so that the residual metal (lithium) component was not left, so that the slurry may be stably managed. From the results, it was found that application of an acid gas ($CO_2$ gas) is effective for efficiently decreasing residual metal (lithium).

Evaluation Example 3: Evaluation of Washing Effect Depending on Washing Concentration In order to evaluate the washing effect depending on the washing concentration, the results of evaluating ref., Examples 1, 4, and 5, and Comparative Example 4 are shown in the following Table 3:

TABLE 3

| | Washing solution | Gas injection method | Washing concentration [wt %] | Washing time [min] | Drying method | $Li_2CO_3$ [wt %] | LiOH [wt %] | Slurry pH | Amount of gas produced [%] | Discharge capacity [mAh/g] | Initial efficiency [%] |
|---|---|---|---|---|---|---|---|---|---|---|---|
| ref. | — | — | — | — | — | 0.611 | 1.378 | 12.1 | 180 | 1312 | 85.5 |
| Example 1 | $H_2O$ | Bubbling ($CO_2$) | 12 | 30 | Vacuum | 0.205 | 0.014 | 8.8 | — | 1340 | 86.1 |
| Example 4 | $H_2O$ | Bubbling ($CO_2$) | 24 | 30 | Vacuum | 0.328 | 0.018 | 8.8 | — | 1367 | 86.8 |
| Example 5 | $H_2O$ | Bubbling ($CO_2$) | 50 | 30 | Vacuum | 0.944 | 0.013 | 9.2 | — | 1367 | 87.0 |
| Comparative Example 4 | $H_2O$ | Bubbling ($CO_2$) | 75 | 30 | Vacuum | 0.779 | 1.104 | 10.9 | ≥80 | 1327 | 86.1 |

Referring to the results of Table 3, as the washing concentration was higher (as the content of the negative electrode active material to be washed was higher), discharge capacity and initial efficiency tended to be increased, but in Comparative Example 4 having an excessive washing concentration, the content of residual lithium was excessive, and the amount of gas produced was 80% or more so that slutty stability was poor, and the discharge capacity and the initial efficiency were poorer than those of Examples 4 and 5.

Evaluation Example 4: Evaluation of Washing Effect Depending on Acid Gas Flow Rate In order to evaluate the washing effect depending on the acid gas flow rate, the results of evaluating ref., Examples 1, 6, and 7, and Comparative Example 5 are shown in the following Table 4:

TABLE 4

| | Washing solution | Gas injection method | Acid gas flow rate [mL/min] | Drying method | $Li_2CO_3$ [wt %] | LiOH [wt %] | Slurry pH | Amount of gas produced [%] | Discharge capacity [mAh/g] | Initial efficiency [%] |
|---|---|---|---|---|---|---|---|---|---|---|
| ref. | — | — | — | — | 0.611 | 1.378 | 12.1 | 180 | 1312 | 85.5 |
| Example 1 | $H_2O$ | Bubbling ($CO_2$) | 300 | Vacuum | 0.205 | 0.014 | 8.8 | — | 1340 | 86.1 |
| Example 6 | $H_2O$ | Bubbling ($CO_2$) | 10 | Vacuum | 2.463 | 0.026 | 9.5 | 20 | 1328 | 86.5 |
| Example 7 | $H_2O$ | Bubbling ($CO_2$) | 100 | Vacuum | 0.574 | 0.027 | 9 | — | 1372 | 86.6 |
| Comparative Example 5 | $H_2O$ | Bubbling ($CO_2$) | 5 | Vacuum | 0.334 | 1.146 | 11.4 | ≥120 | 1318 | 85.4 |

Referring to the results of Table 4, as the acid gas flow rate was higher, the content of residual lithium tended to be further decreased, and in Example 1, and 7 of the present invention, the content of residual lithium was effectively decreased, and thus, sufficient discharge capacity and initial efficiency were secured while slurry stability was secured with the low amount of gas produced.

In particular, in Examples 1 in which the acid gas flow rate satisfied 15 to 350 mL/min, the residual lithium was sufficiently decreased, and thus, sufficient discharge capacity and initial efficiency were secured while slurry stability was secured.

Meanwhile, in Comparative Example 5 in which the acid gas flow rate was excessively low, the content of residual lithium, LiOH was high, and thus, the amount of gas produced was 120% to have poor slurry stability, and the discharge capacity and the initial efficiency were poorer than those of the examples.

Evaluation Example 5: Evaluation of Washing Effect Depending on Washing Time

In order to evaluate the washing effect depending on the washing time, the results of evaluating ref., Examples 1, 8, and 9, and Comparative Example 6 are shown in the following Table 5:

TABLE 5

| | Washing solution | Gas injection method | Washing time [min] | Drying method | $Li_2CO_3$ [wt %] | LiOH [wt %] | Slurry pH | Amount of gas produced [%] | Discharge capacity [mAh/g] | Initial efficiency [%] |
|---|---|---|---|---|---|---|---|---|---|---|
| ref. | — | — | — | — | 0.611 | 1.378 | 12.1 | 180 | 1312 | 85.5 |
| Example 1 | $H_2O$ | Bubbling ($CO_2$) | 30 | Vacuum | 0.205 | 0.014 | 8.8 | — | 1340 | 86.1 |
| Example 8 | $H_2O$ | Bubbling ($CO_2$) | 60 | Vacuum | 0.412 | 0.026 | 9.2 | — | 1360 | 86.1 |
| Example 9 | $H_2O$ | Bubbling ($CO_2$) | 10 | Vacuum | 0.345 | 0.053 | 9.8 | 30 | 1326 | 86.1 |
| Comparative Example 6 | $H_2O$ | Bubbling ($CO_2$) | 5 | Vacuum | 0.872 | 0.994 | 11.1 | ≥80 | 1330 | 85.8 |

Referring to the results of Table 5, as the washing time was longer, the content of residual lithium tended to be further decreased, and when the washing time was more than 10 minutes, a tendency of sufficient washing effect was shown. In Examples 1, 8, and 9 of the present invention, since the content of residual lithium was effectively decreased, the amount of gas produced was low, and thus, sufficient discharge capacity and initial efficiency were secured while slurry stability was secured.

In particular, in Examples 1 and 8 in which the washing time satisfied 15 to 70 minutes, the residual lithium was sufficiently decreased and the amount of gas produced was 0%, and thus, sufficient discharge capacity and initial efficiency were secured while slurry stability was secured.

Meanwhile, in Comparative Example 6 in which the washing time was excessively short, the content of residual lithium was high, and thus, the amount of gas produced was 80% to have poor slurry stability, and the discharge capacity and the initial efficiency were poorer than those of the examples.

Evaluation Example 6: Evaluation of Washing Effect Depending on $CO_2$ Bubbling

In order to evaluate the washing effect depending on the $CO_2$ bubbling, the results of evaluating ref., Examples 1, 10, and 11, and Comparative Examples 1 and 7 to 10 are shown in the following Table 6:

TABLE 6

| | Washing solution | Gas injection method | $CO_2$ flow rate [mL/min] | $Li_2CO_3$ [wt %] | LiOH [wt %] | Slurry pH | Gas produced [%] | Discharge capacity [mAh/g] | Initial efficiency [%] |
|---|---|---|---|---|---|---|---|---|---|
| ref. | — | — | — | 0.611 | 1.378 | 12.1 | 180 | 1312 | 85.5 |
| Example 1 | H2O | Bubbling ($CO_2$) | 300 | 0.205 | 0.014 | 8.8 | — | 1340 | 86.1 |
| Comparative Example 1 | H2O | — | — | 0.329 | 1.222 | 11.4 | ≥150 | 1322 | 85.8 |
| Example 10 | 0.1M CH3COOH | Bubbling ($C_o2$) | 300 | 0.344 | 0 | 8.6 | — | 1362 | 86.7 |
| Comparative Example 7 | 0.1M CH3COOH | — | — | 1.271 | 0.060 | 10.2 | ≤20 | 1357 | 86.7 |
| Comparative Example 8 | 1M CH3COOH | — | — | 0.987 | 0 | 9.0 | — | 1320 | 85.4 |
| Example 11 | 0.1M HCl | Bubbling ($CO_2$) | 300 | 0.106 | 0 | 8.4 | — | 1345 | 86.5 |
| Comparative Example 9 | 0.1M HCl | — | — | 1.235 | 0 | 10.0 | — | 1348 | 85.9 |
| Comparative Example 10 | 1M HCl | — | — | 0.625 | 0 | 8.6 | — | 1301 | 85.0 |

Referring to the results of Table 6, the content of residual lithium and the decreased amount of pH were increased in the order of purified water—weak acid—strong acid, and this is because the residual lithium remaining on the surface of the raw material reacted with the washing solution and was dissociated and then was removed with the washing solution. In particular, when the strong acid solution was applied, this effect was particularly increased, and this is because the oxidation of the residual lithium rapidly proceeded in the acid component.

Upon comparison of Example 1 with Comparative Example 1, in Comparative Example 1, only water washing was performed without $CO_2$ bubbling, and as a result, the amount of a decrease in the content of residual lithium, LiOH was not large as compared with ref in which the acid gas treatment process b) was not performed, and the discharge capacity and initial efficiency were poorer than those of Example 1.

Upon comparison of Example 10 with Comparative Examples 7 and 8, in Comparative Example 7 using a weak acid, $Li_2CO_3$ remained at a relatively high content, and thus, the discharge capacity was poorer than those of Example 10. Meanwhile, in Comparative Example 8 using a high-concentration acid, the residual lithium was decreased, but the lithium silicate in the active material particles was lost, and thus, the discharge capacity and the initial efficiency were poorer than those of Example 10. In Example 10, $LiHCO_3$ was produced according to Reaction Formula 2 in which $Li_2CO_3$ and $CO_2$ reacted by $CO_2$ bubbling, thereby promoting removal of $Li_2CO_3$, sufficient discharge capacity and initial efficiency were secured while the content of residual lithium was effectively decreased.

Upon comparison of Example 11 with Comparative Examples 9 and 10, in Comparative Example 9 using a strong acid, $Li_2CO_3$ remained at a relatively high content, and thus, the discharge capacity and the initial efficiency were poorer than those of Example 11. Meanwhile, in Comparative Example 10 using a high-concentration strong acid solution, the residual lithium was decreased, but the lithium silicate in the active material particles was lost, and thus, the discharge capacity was poorer than those of Example 11. In Example 11, $LiHCO_3$ was produced according to Reaction Formula 2 in which $Li_2CO_3$ and $CO_2$ reacted by $CO_2$ bubbling, thereby promoting removal of $Li_2CO_3$, sufficient discharge capacity and initial efficiency were secured while the content of residual lithium was effectively decreased.

From the results, it was shown that when $CO_2$ bubbling was performed as in the examples of the present invention, sufficient discharge capacity and initial efficiency were secured while the content of residual lithium was effectively decreased, and slurry stability was also secured. This means that a high-performance negative electrode active material in a state that the content of residual lithium was excellently controlled and a raw material was not damaged may be produced by the $CO_2$ bubbling.

Evaluation Example 7: Evaluation of Rate of Increase/Decrease in Oxygen Concentration In order to evaluate the rate of increase/decrease in oxygen concentration, the rate of increase/decrease in oxygen concentration of the negative electrode active materials of ref., Examples 1, 2, and 4, and Comparative Example 1 were measured, and are shown in the following Table 7.

The rate of increase/decrease in oxygen concentration of the lithium-doped negative electrode active material depending on the acid gas treatment process b) was measured. The oxygen (O) concentration (o) was measured by ICP analysis, and the rate of increase/decrease in oxygen (O) concentration was derived by the following Formula (1):

$$(C2-C1)/C1*100 \quad (1)$$

wherein C1 is an oxygen concentration in the metal-doped silicon-based material before the acid gas treatment process b), and C2 is an oxygen concentration in the metal-doped silicon-based material after the acid gas treatment process b).

0 concentration of the ref. negative electrode active material was substituted into the C1 value in Formula (1). Since the ref. negative electrode active material was not subjected to the acid gas treatment process b), it was regarded as the oxygen concentration of the negative electrode active material before performing the oxygen gas treatment process b) (or which was not subjected to the process).

In Formula (1), the 0 concentration of the negative electrode active material of each of the examples in which the process b) was performed was substituted into the $C_2$ value.

TABLE 7

| | $Li_2CO_3$ [wt %] | LiOH [wt %] | Slurry pH | Amount of gas produced [%] | Discharge capacity [mAh/g] | Initial efficiency [%] | Oxygen (O) content [%] | rate of increase/decrease in oxygen (O) concentration [%] |
|---|---|---|---|---|---|---|---|---|
| ref. | 0.611 | 1.378 | 12.1 | 180 | 1312 | 85.5 | 32.7 | — |
| Example 1 | 0.205 | 0.014 | 8.8 | — | 1340 | 86.1 | 32.8 | +0.31 |
| Example 2 | 1.025 | 1.044 | 11.4 | 40 | 1343 | 87.3 | 32.1 | −1.83 |
| Example 4 | 0.328 | 0.018 | 8.8 | — | 1367 | 86.8 | 32.0 | −2.14 |
| Comparative Example 1 | 0.329 | 1.222 | 11.4 | ≥150 | 1322 | 85.8 | 33.2 | +1.53 |

Referring to the results of Table 7, it was confirmed that when the acid gas treatment process b) according to the present invention was performed, residual lithium in the negative electrode active material was effectively removed, and thus, the rate of increase/decrease in oxygen concentration was +1.5% or less.

According to the present invention, the problems described above may be solved by, in the process of effectively performing controlling residual lithium of a prelithiated silicon-based negative electrode active material particles, using an acid gas in a process of water washing or low-concentration acid washing, or in an exemplary embodiment, using a method of blowing an acid gas, performing water washing and then drying in an acid gas atmosphere, or bubbling an acid gas into a washing solution to minimize damage to a raw material itself to maximize capacity and initial efficiency and also maximize residual lithium control.

According to the present invention, a slurry viscosity over time and a uniform concentration in a slurry are maintained in production of a water-based slurry and electrode coating by the method, thereby maintaining a stable slurry state and allowing safe slurry storage, transport, and coating by hydrogen gas production suppression and the like.

As a specific exemplary embodiment, first, an acid gas is blown, thereby performing modification into more stable residual lithium to lower reaction activity.

In a specific exemplary embodiment, second, an acid gas is dissolved and bubbled in an aqueous solution or low-concentration acid solution to increase the removal efficiency of residual lithium without damage to a raw material.

Besides, according to the present invention, the process conditions of the acid gas may be changed to adjust the content of residual lithium to a desired level, and as a result, a raw material having residual lithium controlled to a level which is difficult to obtain in a process of directly immersing a conventional negative electrode active material in a high-concentration acid solution or strong acid solution for washing is synthesized, thereby effectively performing electrochemical performance and slurry physical property control.

According to the present invention, problems such as slurry viscosity change over time, hydrogen gas production, and binder deterioration, which may arise when using a prelithiated silicon-based negative electrode active material, may be all solved by effective control of residual lithium, and in order to overcome a limitation of a previously known method such as water washing and acid washing, an additional acid gas is introduced to maximize the efficiency by low-concentration acid or water washing.

Although the exemplary embodiments of the present invention have been described above, the present invention is not limited to the exemplary embodiments but may be made in various forms different from each other, and those skilled in the art will understand that the present invention may be implemented in other specific forms without departing from the spirit or essential feature of the present invention. Therefore, it should be understood that the exemplary embodiments described above are not restrictive, but illustrative in all aspects.

What is claimed is:

1. A method of producing a negative electrode active material for a secondary battery, the method comprising:

a) a metal doping process of mixing a silicon-based material and a metal precursor and performing a heat treatment to dope the silicon-based material with a metal; and b) an acid gas treatment process of treating the metal-doped silicon-based material in an acid gas atmosphere to remove residual metal, wherein the acid gas treatment process b) includes:

b1) mixing the metal-doped silicon-based material with an aqueous solution at pH 1 to 9 and bubbling an acid gas in the mixed aqueous solution.

2. The method of producing a negative electrode active material for a secondary battery of claim 1, wherein the silicon-based material of the metal doping process a) includes a silicon oxide ($SiO_x$, $0<x\leq 2$).

3. The method of producing a negative electrode active material for a secondary battery of claim 1, wherein the silicon-based material of a) has a carbon coating layer provided on part or all of the surface.

4. The method of producing a negative electrode active material for a secondary battery of claim 1, wherein the metal doping process a) is heat treating at a temperature of higher than 500° C. and lower than 700° C. under an inert atmosphere.

5. The method of producing a negative electrode active material for a secondary battery of claim 1, wherein the metal precursor of the metal doping process a) includes one or more of:

metal particles including one or more selected from the group consisting of Li, Na, Mg, and K; and metal hydrides, metal hydroxides, metal oxides, or metal carbonates including one or more selected from the group consisting of Li, Na, Mg, and K.

6. The method of producing a negative electrode active material for a secondary battery of claim 1, wherein the acid gas treatment process b) further includes one or more of the following processes b2) to b3):

b2) blowing an acid gas in the metal-doped silicon-based material; and b3) washing the metal-doped silicon-based material with water, and then drying the material under an acid gas atmosphere.

7. The method of producing a negative electrode active material for a secondary battery of claim 1, wherein in the process of bubbling the acid gas b1), the metal-doped silicon-based material is mixed at a concentration of 0.1 to 70 wt % with an aqueous solution of pH 1 to 9.

8. The method of producing a negative electrode active material for a secondary battery of claim 1, wherein in the process of bubbling the acid gas b1), a flow rate of the acid gas is 8 to 700 mL/min.

9. The method of producing a negative electrode active material for a secondary battery of claim 1, wherein the acid gas of the acid gas treatment process b) includes one or more selected from the group consisting of $CO_2$, COS, $SO_2$, $SO_3$, NO, $N_2O$, $NO_2$, $N_2O_3$, $N_2O_4$, $N_2O_5$, $Cl_2$, HCl, HF, and $H_2S$.

10. The method of producing a negative electrode active material for a secondary battery of claim 1, wherein before and after the acid gas treatment process b), the metal-doped silicon-based material has a rate of increase/decrease in oxygen concentration represented by the following Formula (1) of +1.5% or less:

$$(C2-C1)/C1*100 \quad (1)$$

wherein C1 is an oxygen concentration in the metal-doped silicon-based material before the acid gas treatment process b), and C2 is an oxygen concentration in the metal-doped silicon-based material after the acid gas treatment process b).

11. The method of producing a negative electrode active material for a secondary battery of claim 1, wherein after the acid gas treatment process b), the metal-doped silicon-based material includes 4 wt % or less of the residual metal with respect to the total weight.

12. The method of producing a negative electrode active material for a secondary battery of claim 1, wherein the residual metal of the acid gas treatment process b) includes one or more of:

metal particles including one or more selected from the group consisting of Li, Na, Mg, and K; and metal hydrides, metal hydroxides, metal oxides, or metal carbonates including one or more selected from the group consisting of Li, Na, Mg, and K.

13. The method of producing a negative electrode active material for a secondary battery of claim 12, wherein after the acid gas treatment process b), the metal-doped silicon-based material includes 3.0 wt % or less of the metal carbonate as the residual metal with respect to the total weight.

14. The method of producing a negative electrode active material for a secondary battery of claim 1, further comprising: c) a drying process of drying the acid gas-treated silicon-based material of b) at 10 to 170° C.

* * * * *